United States Patent
Hämäläinen et al.

[11] Patent Number: 5,815,801
[45] Date of Patent: Sep. 29, 1998

[54] METHOD FOR ESTIMATING THE QUALITY OF A CONNECTION, AND A RECEIVER

[75] Inventors: Seppo Hämäläinen, Espoo; Jere Keurulainen, Helsinki, both of Finland

[73] Assignee: Nokia Mobile Phones Ltd., Salo, Finland

[21] Appl. No.: 645,023

[22] Filed: May 15, 1996

[30] Foreign Application Priority Data

May 17, 1995 [FI] Finland .................................. 952397

[51] Int. Cl.⁶ .................................................. H04B 15/02
[52] U.S. Cl. ........................ 455/63; 455/673; 455/226.1; 370/335
[58] Field of Search .................................. 455/501, 504, 455/506, 524, 63, 67.3, 226.1, 226.2, 226.3, 67.1, 62, 68, 69, 70, 422, 450, 452, 455; 370/335, 342, 315, 320, 327, 329, 340, 341; 375/200, 205, 208, 254, 285

[56] References Cited

U.S. PATENT DOCUMENTS

| | | | |
|---|---|---|---|
| 5,048,015 | 9/1991 | Zilberfarb | 370/335 |
| 5,099,493 | 3/1992 | Zeger et al. | 375/1 |
| 5,345,448 | 9/1994 | Keskitalo | 370/95.3 |
| 5,345,598 | 9/1994 | Dent | 455/67.1 |
| 5,377,221 | 12/1994 | Munday et al. | 455/63 |
| 5,410,733 | 4/1995 | Niva et al. | 455/33.2 |
| 5,416,797 | 5/1995 | Gilhousen et al. | 375/705 |
| 5,483,668 | 1/1996 | Malkamaki et al. | 455/33.2 |
| 5,539,728 | 7/1996 | Gaiani et al. | 455/69 |
| 5,548,613 | 8/1996 | Kaku et al. | 375/208 |

FOREIGN PATENT DOCUMENTS

| | | |
|---|---|---|
| 0 564 937 A1 | 10/1993 | European Pat. Off. . |
| 0 641 102 A2 | 3/1995 | European Pat. Off. . |
| 0 661 830 A2 | 7/1995 | European Pat. Off. . |
| 0 721 264 A1 | 7/1996 | European Pat. Off. . |
| WO 95/24086 | 9/1995 | WIPO . |

OTHER PUBLICATIONS

Liu, Zhao et al., "SIR–Based Call Admission Control for DS–CDMA Cellular Systems", IEEE Journal on Selected Areas in Communications, vol. 12, No. 4, May 1994, pp. 638–644.

*Primary Examiner*—Thanh Cong Le
*Attorney, Agent, or Firm*—Perman & Green, LLP

[57] ABSTRACT

A method for estimating the quality of a connection in a cellular radio system, and a receiver of a cellular radio system, utilizing comparison circuitry for estimating, by use of received pilot signals and received combined broadband signal the interference caused by base stations at the terminal equipment. The method may be utilized e.g. for distributing the traffic load of the base stations and in interference cancellation methods.

20 Claims, 1 Drawing Sheet

METHOD FOR ESTIMATING THE QUALITY OF A CONNECTION, AND A RECEIVER

BACKGROUND OF THE INVENTION

The present invention relates to a method for estimating the quality of a connection in a receiver of a subscriber terminal equipment in a cellular radio system when each base station is transmitting a pilot signal in the cellular radio system.

The invention further relates to a receiver of a cellular radio system.

In a cellular radio system, the quality of the connection between a base station and a subscriber terminal equipment varies constantly. This variation is due to interference factors occurring on the radio path, as well as attenuation of radio waves as a function of distance. Interference is also caused at the receiver of the terminal equipment by those signals that arrive from other base stations in the coverage area, serving other terminal equipments.

In a CDMA method, the narrow-band data signal of the user is modulated by a spreading code having a remarkably broader band than the data signal to a relatively broad band. In the known experimental systems, bandwidths of 1.25 MHz, 10 MHz, and 50 MHz, for instance, have been used. The spreading code usually consists of a long pseudorandom bit sequence. The bit rate of the spreading code is much higher than that of a data signal, and to make a distinction between the spreading code and data bits and symbols, the bits of the spreading code are termed as chips. Each data symbol of the user is multiplied by all chips of the spreading code. Thus, the narrow-band data signal spreads onto the frequency band used by the spreading code. Each user has an individual spreading code. Several users transit simultaneously on the same frequency band, and data signals are distinguished from each other in the receivers on the basis of a pseudorandom spreading code. An example of CDMA is a cellular radio standard EIA/TIA IS-95.

A receiver is preliminary synchronized with the received signal by means of a pilot signal sent by the base station, and thereafter, correlators located in the receivers are synchronized with a desired signal, which they identify on the basis of the spreading code. The correlators return the data signal onto the original narrow frequency band. In an ideal case, the signals arriving at the receiver, which signals have been multiplied by another spreading code, do not correlate in the receiver, but maintain their broad band. An attempt is made to choose the spreading codes employed by the system so that they do not correlate with each other, that is, they are mutually orthogonal.

It is typical of a cellular network environment that the signal travelling between the user and the base station does not propagate straight, but, depending on the features of the environment, along several routes of different lengths from the transmitter to the receiver. This multipath propagation takes place although there would be a straight visual contact between a base station and a mobile station. Multipath propagation is mainly due to reflections of the signal from the surrounding surfaces. Signals travelling different routes have different delays in the propagation time, and they thus arrive at the receiver in different phases.

Generally speaking, the spreading codes are not orthogonal at all possible error values. Therefore, signals delayed in different ways cause interference in the detection of other signals. The users thus interfere with each other, and this interference is termed as multiuser interference. CDMA is an interference limited system. When the number of users, and thus also the effect of the multiuser interference increases, the signal-to-interference ratio of the connections becomes poorer. At a certain number of users, the signal-to-interference ratio increases so high that maintaining the connection is complicated, and the number of users cannot be increased without risking the quality of the existing connections. Typically, on one radio channel having a bandwidth of 1.25 MHz, for instance, there may be up to 30–40 simultaneous CDMA connections. If more channel capacity is needed e.g. at the base station, it requires taking a new radio channel into use.

In a cellular radio environment, the users are located randomly with respect to the base station and to each other. Attenuation of the signal between the base station and the terminal equipment is described by means of attenuation with communication distance, which increases at least quadratically as the distance increases. For this reason, terminal equipments located near the base station may cover the transmission of the stations located more remote especially if the power control of the terminal equipments is not accurate, since even a small correlation of a strong signal may cause a major interference in the detection of a weak signal. This phenomenon is termed as a near-far problem. The aim of the power control of the terminal equipments is to enable the same power level to be received at the base station from all the terminal equipments, regardless of the distance of the terminal equipment from the base station. It is difficult to implement accurate power control, however, e.g. due to the rapidly changing nature of the radio channel.

Multiuser interference of CDMA systems has also been reduced by means of various prior art multiuser interference cancellation methods (IC, Interference Cancellation), and multiuser detection (MUD). This methods are best suited for reducing interference originating from the user's own cell, and thus for increasing the capacity of the system. These methods, however, do not provide improvement in the size of the area covered by the base station, in other words, the size of the cell remains unchanged when these methods are employed.

A so-called RAKE receiver if generally used as a CDMA receiver, comprising one or more RAKE branches. Each branch is an independent receiver unit whose task it is to combine and demodulate one received signal component. Each RAKE branch can be commanded to be synchronized with a signal component that has travelled along its individual route, and in a conventional CDMA receiver, the signals of the receiver branches are advantageously combined, which provides a high-quality signal.

In a CDMA cellular radio system, a pilot signal may be used e.g. in the following manner. In a preferred embodiment of the invention, each base station transmits a pilot signal, which is usually a part of a pseudorandom spreading code. The subscriber terminal equipment uses said pilot signal for synchronization of the reception, as well as for preliminary time, frequency and phase identification of the base station. The subscriber terminal equipment receives the pilot signal continuously. All the base stations transmit a pilot signal that has been encoded in the same way, but the phase offsets of the spreading codes of the signals differ from each other, which enables distinguishing the signals, and thus the base stations from each other. As the codes of the pilot signals are similar, the subscriber terminal equipment will find the time synchronization of the system at one time when it goes through all the code phases. In accordance with a prior art technique, the strongest signal found corresponds to the code phase of the best base station.

In a normal case, the subscriber terminal equipment does not take into account the interference caused by the base stations regarding each base station individually. In that case, the unbalance in the traffic load between the base stations may be taken into account in some elements of the network only. If it is desirable that the subscriber terminal equipment should be aware of the interference levels caused by the different base stations, the subscriber terminal equipment must be transmitted the information on the traffic load of the base station along the signalling channel.

SUMMARY OF THE INVENTION

The object of the present invention is to estimate the interferences caused by the base stations at the subscriber terminal equipment, to determine the mutual relations of the interferences, and thus to reduce the interferences.

This is achieved with a method of the type described in the introduction, which method is characterized in that the interference caused by one or more base stations is estimated by comparing the pilot signals sent by said base stations with a combined broadband signal.

The receiver of the invention is characterized by comprising comparison means for estimating by means of pilot signals received from said base stations, and the received combined broadband signal the interference caused by one or more base stations at the terminal equipment.

The basic idea of the method of the invention is to calculate by means of the pilot signals, without separate signalling, the signal strength transmitted by one base station in proportion to all other signals arriving at the receiver, and to use the information thus obtained for improving the quality of the connection.

The method of the invention several advantages provides several advantages and solutions to a number of problems. When choosing the base stations, for example, it is advantageous to know the mutual correlations of the base stations regarding the traffic load. If the uneven traffic load of the network is not taken into account, a connection may be established to a base station which is already operating at the upper limit of its capacity. Furthermore, reasonable allocation of the terminal equipments between the base stations will level out the traffic load of the network, and increase the capacity of the network.

In interference cancellation algorithms (e.g. IC), it is naturally advantageous to make an attempt to eliminate the most significant interferences. It is thus advantageous to find out from which base station the major interferences originate. It is more difficult and slower to find an interfering signal as compared with the method of the invention when the MUD algorithm does not know the source of a strong interference.

The solution of the invention enables estimating the interference level caused by each base station in proportion to other base stations from the subscriber terminal equipment. It also enables estimating mutual traffic loads of the base stations.

Since the present cellular radio systems do not separately take the interference of the base stations into account, the uneven traffic load of the network and the base stations is thus not considered either. In the solution in accordance with the invention, the correlations related to the traffic load between the base stations are known by the subscriber terminal equipment, and the RAKE element may thus be allocated better than heretofore, thus improving the performance of the network.

If information on the traffic load of the cell or on the total transmission power is transmitted from all the base stations that are being studied, it requires a remarkable amount of additional signalling, which is a significant drawback compared with the solution of the invention.

BRIEF DESCRIPTION OF THE DRAWING

In the following, the invention will be described with reference to the examples in the attached drawings, in which.

DETAILED DESCRIPTION OF THE INVENTION

Figure 1:
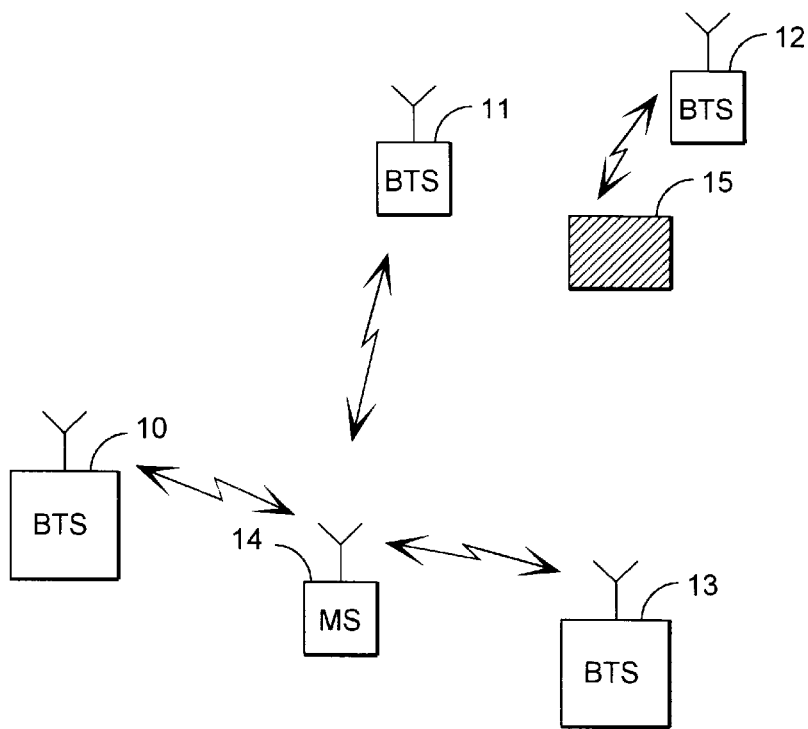
FIG. 1 shows the parts of a CDMA cellular radio system which are essential to the invention.

The method of the invention may be used in a CDMA system transmitting a pilot signal. FIG. 1 shows an example of a CDMA cellular radio system in which it is assumed that the actual data transmission takes place between a base station 10 and a subscriber terminal equipment 14. Base stations 11, 12, and 13 are interfering with the transmission. Since the base stations are located within different distances from the subscriber terminal equipment, and behind different natural obstacles, buildings, etc., the interfering effects of their transmissions are different in strength. In a situation as shown in FIG. 1, the interfering effect of base station 13 is the strongest, as it is located near a terminal equipment. Base station 11 is located relatively far away, and the interference caused by it is thus only moderate, whereas the interference caused by base station 12 is minor since it is located far away and behind a natural obstacle 15. When the subscriber terminal equipment moves, the situation changes constantly.

In the solution in accordance with the invention, the terminal equipment receives the pilot signal of the base station listened, and obtains from it the preliminary information for receiving the actual data signal. At the terminal equipment, the pilot signal sent by each base station is measured, and in an advantageous embodiment, said signal is compared by means of correlation with a received combined broadband signal. Said comparison is most advantageously carried out parallel, that is, simultaneously for several pilot signals. The comparison may also be carried out in series, i.e. in one comparison, only one pilot signal at a time is compared with the combined broadband signal. The correlation result may be calculated e.g. on the basis of formula (1) for each base station:

$$S_i = \int_0^T P_i \cdot I \, dt, \qquad (1)$$

in which $P_i$ represents the pilot signal received from the $i^{th}$ base station, T is the measurement period, and I is the received combined broadband signal. The subscript i indicates the number with which a reference is made to each base station separately. Mathematical operations, such as removing the average, variance normalization, interpolation, decimation, filtering, etc. may be carried out for the measurement results prior to calculating the correlation. The correlation result may be proportioned to the distance of the transmitter and the receiver, and other factors having an effect on the connection by taking the attenuation with communication distance into account, herein marked with $c_i$. Thus, the attenuation with communication distance $c_i$ is also the weighting coefficient of the $i^{th}$ base station. The weighting coefficient $c_i$ may advantageously also be shown in form of a formula 2:

$$c_i = \frac{P_i^{transmitted}}{P_i^{received}}, \quad (2)$$

in which the information on the transmission power is known from before. A weighted correlation $K_i$ can now be calculated as a product of the correlation $S_i$ and the weighting coefficient $c_i$, i.e. $K_i=S_i\times c_i$. The weighting coefficient may also be disregarded, in which case the value of the weighting coefficient $c_i$ is one. The parameters $Q_i$ for weighting the interferences caused by the different base stations are advantageously obtained by means of a formula 3:

$$Q_i = \frac{K_i}{\sum_{n=1}^{N} K_n}, \quad (3)$$

in which N represents the number of the base stations, representing one or more of all the base stations received by the terminal equipment. In other words, the parameter $Q_i$ of one base station is the proportion of the weighted correlation coefficient $K_i$ of said base station to the sum of the weighted correlation coefficients of all the base stations included in the measurements.

Figure 2:
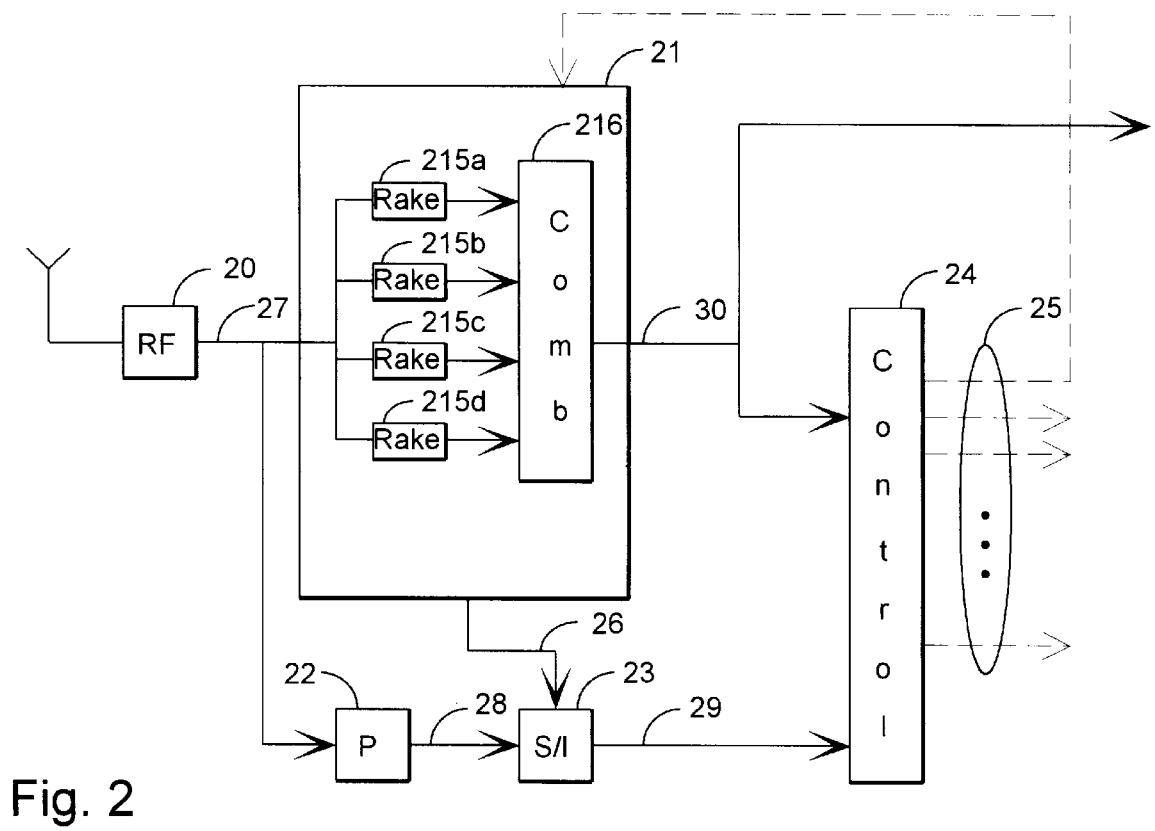
FIG. 2 is a block diagram illus-trating the structure of the receiver of the invention.

The receiver illustrated in FIG. 2 showing one possible embodiment of the invention comprises means for making a comparison between the combined broadband signal and the pilot signals received from different base stations. The receiver comprises a radio frequency element 20, a detector unit 21, a signal strength measuring element 22, a load estimating unit 23, in which attenuation with communication distance is also taken into account in a preferred embodiment of the invention, and a control unit 24. Block 21 comprises RAKE branches 215a–215d and a block 216, which comprises e.g. diversity combiner, interference cancellation means, power estimating means, and decoding means. A signal received in the radio frequency element 20 is converted from the carrier frequency into a broadband signal 27 containing data. Thereafter, the signal 27 enters the detector unit 21, which measures the strength of the pilot signal, combines the signals received from the RAKE branches advantageously, and decodes the signal. In this example, four correlator branches 215a–215d operate as RAKE elements, being able to operate as searchers or receiver branches. The signal 27 also branches after the radio frequency element 20 into the signal strength measuring element 22, in which the strength of the combined broadband signal 27 is measured. In the load estimating unit 23, at which both the combined broadband signal 28 and the pilot signal 26 arrive, the effect of the interference caused by various base stations in proportion to the combined broadband signal is estimated with the method of the invention. When the strengths of the pilot signals of the base stations measured in the detector unit 21 are also taken into account in a preferred embodiment of the invention, the relative interference levels of the base stations may be determined, that is, a parameter $Q_i$ is obtained describing the interference level of the each base station individually. Said parameter may be calculated e.g. with formula 3. The control unit 24 controls the receiver on the basis of a signal 30, that is, on the basis of the bits of the user and a signal 29 coming from the load estimating unit 23. The load estimating unit 23 thus has an effect on handover algorithms of the control unit 24, interference cancellation, allocation of RAKE elements, power control, and MUD control. The control signals of the receiver going out from the control unit 24 are marked with arrows 25. The control unit 24 controls the detector unit 21, among other things. The invention thus relates to block 23 of FIG. 2, that is, the load estimating unit. The load estimating unit provides an estimate of the relative interference levels of the base stations by means of the method of the invention. This estimate may be utilized in the control unit 24 controlling the operation of the receiver. Although various means may be utilized to implement the present inventive method, a VLSI or an ASK circuit based on digital signal processing is utilized in the preferred embodiment of the invention due to its simplicity of operation and construction.

When the terminal equipment is aware of the relative interference levels $Q_i$ of the base stations, this piece of information may be utilized e.g. in a handover algorithm, allocation of MUD, allocation of RAKE elements, etc. The method does not increase the amount of signalling, but it makes the terminal equipment more independent, and less dependent on the control received from the network.

Although the invention has been disclosed above with reference to the example in accordance with the attached drawings, it is obvious that the invention is not limited thereto, but it may be modified in a number of ways within the inventive idea disclosed in the attached claims.

What is claimed is:

1. A method for estimating the quality of a connection in a receiver of a subscriber terminal equipment in a CDMA cellular radio system having a plurality of base stations, the estimating being accomplished when each of said base stations is transmitting a pilot signal, wherein interference caused by transmissions of one or more of said base stations is estimated by comparing the strengths of the pilot signals transmitted by individual ones of said base stations with the strength of a received broadband signal within a given measurement period, said received broadband signal comprising a plurality of data signals wherein each of said data signals is modulated by a spectral spreading code enlarging a bandwidth of the data signal.

2. A method as claimed in claim 1, wherein the comparison of two or more received pilot signals and the received broadband signal is carried out parallel so that several comparisons are going on simultaneously.

3. A method as claimed in claim 1, wherein the comparison of the received pilot signals and the received broadband signal is carried out in series so that the comparisons are made consecutively one at a time.

4. A method as claimed in claim 1, wherein the comparison of the received pilot signals and the received broadband signal is carried out by calculating the correlation between said signals.

5. A method as claimed in claim 1, wherein the attenuation with communication distance between the base station and the receiver is also taken into account in the estimation of the interference levels of the base stations.

6. A method as claimed in claim 5, wherein the attenuation with communication distance is calculated on the basis of the transmission power of the pilot signal of the base station and the power of the pilot signal received by the terminal equipment.

7. A method as claimed in claim 1, wherein only one received pilot signal at a time is compared with the received broadband signal in one comparison.

8. A method as claimed in claim 7 wherein relative interference levels of the transmissions of the respective base stations are obtained in the form of a proportion of the interference level of the individual base stations and the total interference level wherein the total interference level is the sum of individual interference levels.

9. A method as claimed in claim 1, wherein the estimating results of the interference levels of the base stations are utilized when choosing the base station to communicate with.

10. A method as claimed in claim 1, wherein the estimating results of the interference levels of the base stations are utilized in interference cancellation methods.

11. A method as claimed in claim 1 wherein said comparing of strengths of pilot signals includes a correlating of the strengths of the pilot signals transmitted by respective ones of said base stations.

12. A receiver located in a subscriber terminal equipment of a cellular radio system having a plurality of base stations, the receiver serving to estimate the quality of a connection in the receiver when each base station is transmitting a pilot signal, the receiver comprising comparison means for estimating interference by means of the pilot signals received from respective ones of said base stations, said comparison means being operative to compare the strength of an individual one of the pilot signals transmitted by the base stations with the strength of a broadband signal received from the base stations within a given measurement period, and wherein the received broadband signal has interference caused at the terminal equipment by signal transmissions of one or more of the base stations, said received broadband signal comprising a plurality of data signals wherein each of said data signals is modulated by a spectral spreading code enlarging a bandwidth of the data signal.

13. A receiver as claimed in claim 12, comprising means for making a comparison as a correlation between the pilot signal received from the base station and the received broadband signal.

14. A receiver as claimed in claim 12, comprising means for taking into account the attenuation with communication distance in estimating the interference.

15. A receiver as claimed in claim 14, comprising means for calculating the attenuation with communication distance on the basis of the transmission power of the pilot signal of the base station and the power of the pilot signal received by the terminal equipment.

16. A receiver as claimed in claim 12, comprising means for calculating relative interference levels of the base stations.

17. A receiver as claimed in claim 16, comprising means for choosing the base station to communicate with.

18. A receiver as claimed in claim 16, comprising interference cancellation means.

19. A receiver according to claim 12 wherein said comparison means includes correlation means for correlating the strengths of the pilot signals transmitted by respective ones of said base stations.

20. A method for estimating the quality of a connection in a receiver of a subscriber terminal equipment in a CDMA cellular radio system having a plurality of base stations transmitting respective signals each of which includes a pilot tone, the respective signals interfering with each other at the receiver, the method comprising steps of:

receiving a broadband signal composed of a sum of a plurality of transmitted signals from respective ones of said base stations, said received broadband signal comprising a plurality of data signals wherein each of said data signals is modulated by a spectral spreading code enlarging a bandwidth of the data signal;

correlating respective ones of the pilot tones of respective ones of said transmitted signals with said sum of transmitted signals to obtain respective tone correlations; and for each of selected pilot tones of respective ones of said base stations, dividing the tone correlation by the sum of tone correlations of all of said transmitted signals to obtain relative interference levels of the transmitted signals of said base stations.

* * * * *